(12) United States Patent
Hunter

(10) Patent No.: US 6,969,499 B1
(45) Date of Patent: Nov. 29, 2005

(54) BACTERIALLY ASSISTED HEAP LEACH

(75) Inventor: Colin John Hunter, Dalkeith (AU)

(73) Assignee: Bioheap Limited, Northbridge (AU)

( * ) Notice: Subject to any disclaimer, the term of this patent is extended or adjusted under 35 U.S.C. 154(b) by 337 days.

(21) Appl. No.: 10/149,706

(22) PCT Filed: Nov. 24, 2000

(86) PCT No.: PCT/AU00/01437

§ 371 (c)(1),
(2), (4) Date: Jun. 14, 2002

(87) PCT Pub. No.: WO01/44519

PCT Pub. Date: Jun. 21, 2001

(30) Foreign Application Priority Data

Dec. 15, 1999 (AU) .................................. PQ4689

(51) Int. Cl.⁷ .......................... C22B 3/00; C22B 15/00; C22B 23/00
(52) U.S. Cl. ............... 423/27; 423/150.1; 423/DIG. 17
(58) Field of Search .......................... 423/DIG. 17, 27, 423/150.1

(56) References Cited

U.S. PATENT DOCUMENTS 2,829,964 A    4/1958   Zimmerley et al.
4,918,018 A    4/1990   Waskovsky
5,688,304 A *  11/1997  Kohr et al. .................... 75/712

FOREIGN PATENT DOCUMENTS

| AU | 9918524 A1 | 9/1999 |
| EP | 522978 A1 | 1/1993 |
| FR | 2 640 284 A1 | 6/1990 |
| WO | WO 9612826 A1 | 5/1996 |
| WO | WO 9638381 A1 | 12/1996 |

OTHER PUBLICATIONS

Bartlett, R., "Metal extraction from ores by heap leaching", *Metallurgical and Materials Transactions B*, 28B:4(Aug. 1997), pp. 529-545.

* cited by examiner

Primary Examiner—Steven Bos
(74) Attorney, Agent, or Firm—Rothwell, Figg, Ernst & Manbeck, PC

(57) ABSTRACT

A bacterially assisted heap leach characterized by the steps of: providing an ore heap to oxidize sulphide minerals therein; providing a biological contactor inoculated with ferrous iron oxidizing bacteria; providing at least one leach solution pond to feed solution to, and receive leach solution from both the heaps; and bleeding a portion of the leach solution and passing same to a means for metals recovery.

11 Claims, 5 Drawing Sheets

BACTERIALLY ASSISTED HEAP LEACH

FIELD OF THE INVENTION

The present invention relates to a bacterially assisted heap leach. More particularly, the bacterially assisted heap leach of the present invention is intended for use in the recovery of nickel and associated base metals from sulphide ores.

BACKGROUND ART

The recovery of base metals from sulphide ores by bacterially assisted heap leaching is presently restricted to secondary copper sulphide minerals, such as chalcocite and covellite. Chalcopyrite, a primary copper sulphide mineral, is a notable exception and can not presently be successfully leached in a heap. There is currently no proven method available for the successful bacterially assisted heap leaching of nickel sulphides, zinc sulphides or any other base metal sulphide except those of copper, excluding chalcopyrite.

The bacterially assisted heap leach of the present invention has as one object thereof to overcome the problems associated with the prior art, or to at least provide a useful alternative thereto.

The preceding discussion of the background art is intended to facilitate an understanding of the present invention only. It should be appreciated that the discussion is not an acknowledgement or admission that any of the material referred to was part of the common general knowledge in Australia as at the priority date of the application.

Throughout this specification, unless the context requires otherwise, the word "comprise", or variations such as "comprises" or "comprising", will be understood to imply the inclusion of a stated integer or group of integers but not the exclusion of any other integer or group of integers.

DISCLOSURE OF THE INVENTION

A bacterially assisted heap leach characterised by the steps of:
  providing an ore heap to oxidise sulphide minerals therein;
  providing a biological contactor inoculated with ferrous iron oxidising bacteria;
  providing at least one leach solution pond to feed solution to, and receive leach solution from the heap and biological contactor;
  passing leach solution from at least one leach solution pond to the biological contactor; and
  bleeding a portion of the leach solution from at least one leach solution pond and/or the biological contactor and passing that portion of leach solution to a means for metals recovery.

The oxidation of the sulphide ore or fraction thereof is preferably achieved through the action of chemolithotrophic bacteria.

Preferably, the biological contactor is provided in the form of a second heap.

Still preferably, one or both of the heaps are aerated at or near a base thereof.

The second heap is preferably formed of relatively inert waste rock. The second heap may be inoculated with *Thiobacillus ferrooxidans* or similar bacteria.

The bled portion of leach solution is preferably taken from the second heap.

Preferably, the leach solution is recycled more than once through the ore heap to increase the level of dissolved metals therein.

In one form of the invention at least a proportion of the ferric iron in the leach solution is precipitated by hydration. Preferably, the precipitation or iron occurs in the biological contactor. Still preferably, the precipitation of iron occurs only in either or both of the ore heap or biological contactor.

BRIEF DESCRIPTION OF THE DRAWINGS

The present invention will now be described, by way of example only, with reference to two embodiments thereof and the accompanying drawings, in which.

BEST MODE(S) FOR CARRYING OUT THE INVENTION

Figure 1:
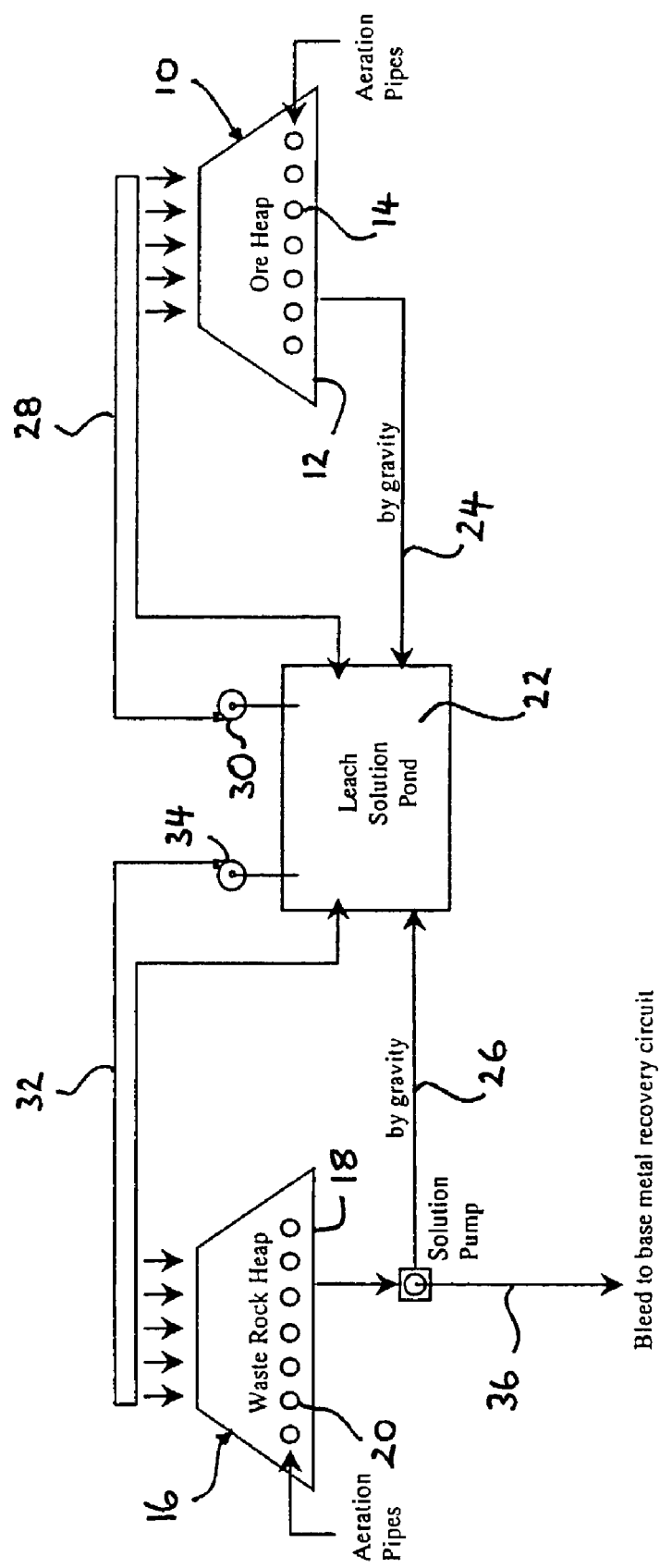
FIG. 1 is a schematic representation or flow sheet of a bacterially assisted heap leach in accordance with a first embodiment of the present invention.

In FIG. 1 there is shown a flow sheet for the bacterially assisted heap leaching of a whole ore or a fraction thereof, by the action of chemolithotrophic bacteria, in accordance with a first embodiment of the present invention. A disseminated sulphide ore is stacked in a heap 10 on an impermeable leach pad 12. It is envisaged that the disseminated sulphide ore may have undergone one or more pre-treatments, for example agglomeration, to improve its permeability or some form of upgrading step to improve its base metal content.

The heap 10 has slotted aeration pipes 14 inserted into a base of the heap 10 to provide a source of oxygen and carbon to the bacteria present in the disseminated sulphide ore. These bacteria are encouraged to multiply and populate the heap, and consequently oxidise the sulphide minerals.

It is envisaged that the process of the present invention may require a different bacterial species to populate the heap and such a species would have to be introduced thereto by way of inoculation. This may be achieved by adding a solution containing the preferred bacteria to the material to be treated before, during or after stacking of the heap 10.

A biological contactor, for example a second heap 16 formed of a relatively inert waste rock is provided on a further impermeable leach pad 18. The second heap 16 is similarly provided with slotted aeration pipes 20 near the base thereof. The heap 16 is inoculated with ferrous iron oxidising bacteria, for example *Thiobacillus ferrooxidans*, which may or may not be indigenous to the heap 16.

A leach solution pond 22 is provided and receives leach solution from the heaps 10 and 16 by way of gravity feed lines 24 and 26, respectively. The heap 10 receives leach solution from the pond 22 by way of feed line 28 in which is provided a pump 30. Any leach solution not fed to the heap 10 is returned to the pond 22.

The heap 16 receives leach solution from the pond 22 by way of feed line 32, in which is provided a pump 34. Any leach solution not fed to the heap 16 is returned to the pond 22.

The delivery of leach solution to the heaps 10 and 16 preferably delivers a consistent and even distribution of leach solution to the top and sides of each heap 10 and 16. A bleed line 36 is provided in the gravity feed line 26 from the heap 16 and is used to bleed leach solution, now being deficient in ferrous iron when compared to the leach solution in the pond 22, out of the circuit shown in FIG. 1 and into a means for metals recovery. Conventional hydrometallurgical means may then be used to recover the base metals from this leach solution.

It is envisaged that the heating or cooling of the leach solution at some point in the flow sheet shown in FIG. 1 may prove advantageous.

The biological contactor may, it is envisaged, alternately be provided in the form of a packed column or rotating biological contactor.

Figure 2:
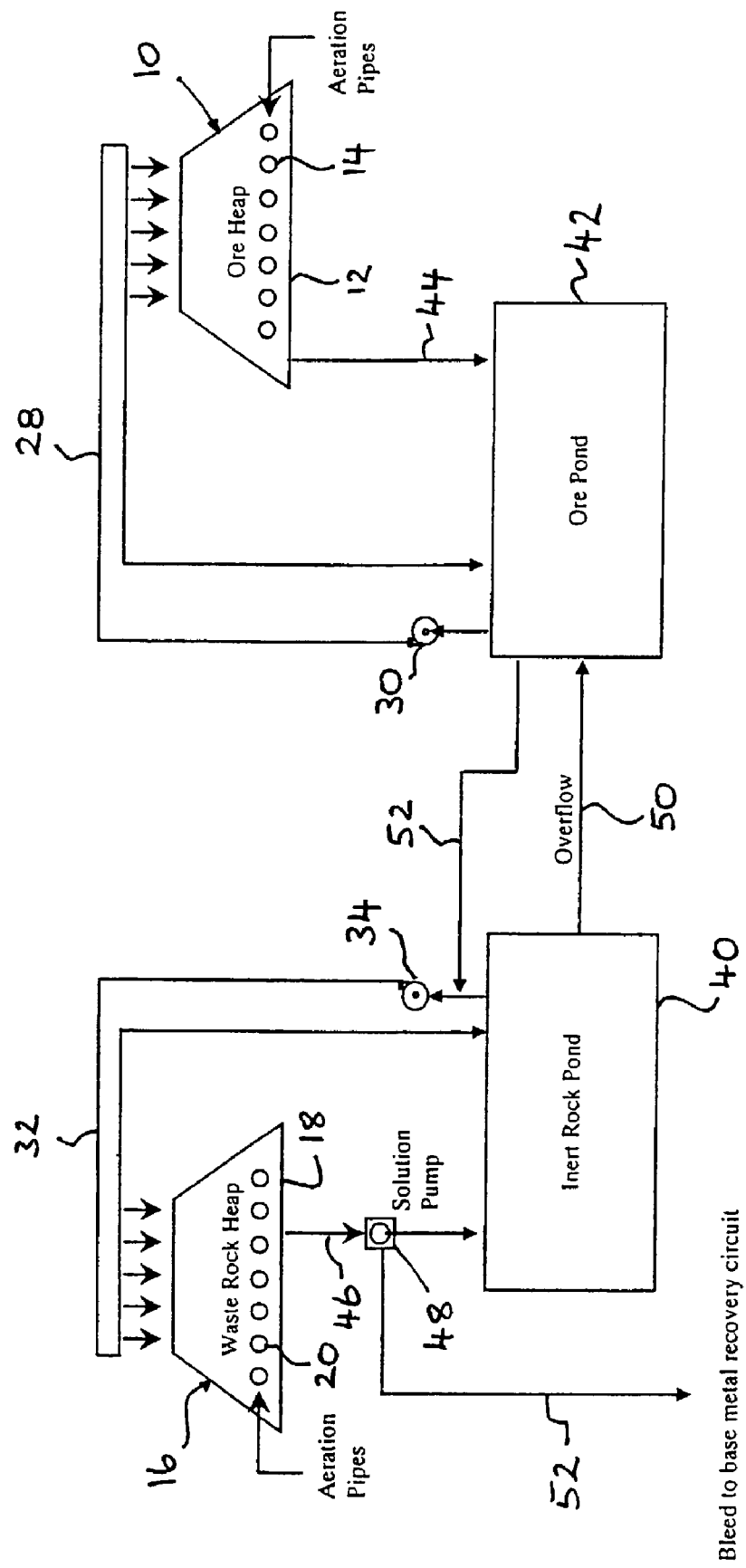
FIG. 2 is a schematic representation or flow sheet of a bacterially assisted heap leach in accordance with a second embodiment of the present invention.
Figure 3:
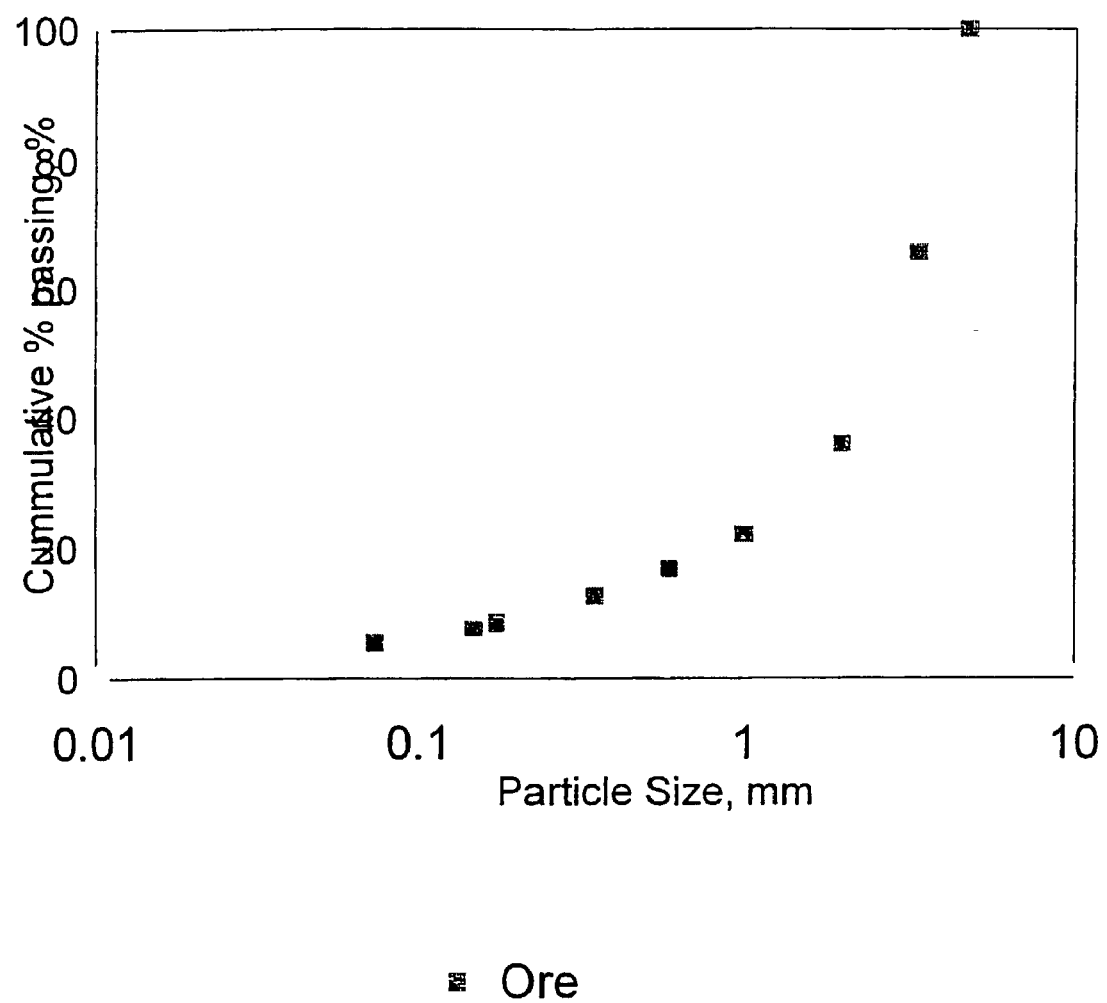
FIG. 3 is a graphical representation of the size distributions of pulverized ore samples of Example I.

In FIG. 2 there is shown a flow sheet for the bacterially assisted heap leaching of a whole ore or a fraction thereof, by the action of chemolithotrophic bacteria, in accordance with a second embodiment of the present invention. The flow sheet is substantially similar to that of the first embodiment shown in FIG. 1 and like numerals denote like components.

The leach solution pond 22 of the first embodiment is replaced by two ponds, being an inert rock pond 40 and an ore pond 42. The ore pond 42 receives leach solution from the heap 10 by way of gravity feed line 44. The heap 10 receives leach solution from the pond 42 by way of the feed line 28. Any leach solution not fed to the heap 10 is returned to the pond 42.

The heap 16 received leach solution from the inert rock pond 40 by way of the feed line 32. Any leach solution not fed to the heap 16 is returned to the pond 40. The pond 40 receives leach solution from the heap 16 by way of a gravity feed line 45 in which is provided a pump 48.

Overflow from the inert rock pond 40 is directed to the ore pond 42 by way of an overflow line 50. Liquor from the ore pond 42 is, in addition to being fed to the heap 10, fed to the heap 16 by way of intermediate line 52 and the feed line 32.

A bleed line 52 is provided in the gravity feed line 46 from the heap 16 and is used to bleed leach solution now deficient in ferrous iron when compared to the leach solution of pond 42, out of the circuit shown in FIG. 2 and into a means for metals recovery. Again, conventional hydrometallurgical means may then be used to recover the base metals from this leach solution.

The use of separate ponds 40 and 42 is envisaged to allow greater flexibility in the circuit than possible with that of FIG. 1. For example, the heaps of the second embodiment may be run under differing conditions as to pH and ferrous to ferric iron ratio.

It is further envisaged that the leach solution may preferably be recycled through each heap 10 and 16 more than once in order to increase the level of dissolved metals. Further, some form of pH control may prove advantageous.

It is still further envisaged that some or all of the ferric iron in the leach solution may advantageously be precipitated by a process of hydration, whereby a jarosite or a goethite product is formed and an acid, usually sulphuric acid, is also formed. This may be encouraged to take place remotely to the heap 10, for example in the heap 16.

The process of the present invention provides for the economic recovery of nickel and other base metal sulphides, for example cobalt and zinc, from their ores. It is envisaged that the capital and operating costs of base metals production by the process of the present invention will compare favourably with conventional recovery processes. Still further, it is envisaged that the process can be applied to mineral deposits of lower base metal value than would typically be economically viable using conventional or prior art methods.

The present invention will now be described with reference to a number of examples. However, it is to be understood that the following examples are not to limit the above generality of the invention.

EXAMPLE I

A bench scale mini-pilot column operation was conducted in an effort to optimise operating conditions for a heap leach in accordance with the first embodiment of the present invention.

A 500 kg bulk sample of a disseminated ore sample from the Radio Hill deposit in Western Australia, Australia was utilised in this example. The sample was air dried prior to crushing, blending and splitting into sub-samples for head assay, inoculum generation, bioleach optimization and the mini-pilot trial. The disseminated ore is known to contain approximately 0.92% Cu, 0.67% Ni, and 0.34% Co.

The sub-samples were pulverized and assayed for $CO_3^{2-}$, total S, and 31 elements by ICPMS. Size distribution of the samples was carried out using various sieve sizes to 38 $\mu$m. Each fraction from the size analysis was assayed for Ni and Cu content. The size distribution and chemical assay of the various fractions are shown in Table 2 and in FIG. 1.

TABLE 1

Chemical Assay Results

| Element | Concentration (mg/Kg) |
|---|---|
| Aluminum | 23000 |
| Antimony | 2.4 |
| Arsenic | 12 |
| Barium | 222 |
| Beryllium | 0.4 |
| Bismuth | 2 |
| Boron | <1 |
| Cadmium | 2.1 |
| Calcium | 60100 |
| Chromium | 476 |
| Cobalt | 336 |
| Copper | 9230 |
| Iron | 111000 |
| Lead | 34.8 |
| Lithium | 12.4 |
| Magnesium | 40400 |
| Manganese | 1520 |
| Molybdenum | 16.2 |
| Nickel | 6670 |
| Potassium | 3760 |
| Rubidium | 4.5 |
| Selenium | 7 |
| Silver | 5.3 |
| Sodium | 14700 |
| Strontium | 113 |
| Sulphur | 4.05 |
| Tellurium | 1.1 |
| Thallium | <0.1 |
| Tin | 12.2 |
| Uranium | 0.3 |
| Vanadium | 173 |
| Zinc | 203 |
| $CO_3^{2-}$ | <0.5 |

TABLE 2

Sieve and Chemical Analysis on RH Disseminated Ore Head

| Sieve # (mesh) | Mass Retained (g) | % Retaining | Cumulative % Passing | Cu (%) | Ni (%) |
|---|---|---|---|---|---|
| 4 | 0 | 0 | 100.0 | | |
| −4 +6 | 344 | 34.37 | 65.6 | 0.84 | 0.60 |
| −6 +10 | 295 | 29.47 | 36.2 | 0.90 | 0.60 |
| −10 +18 | 139 | 13.89 | 22.3 | 0.89 | 0.58 |
| −18 +30 | 53 | 5.29 | 17.0 | 0.89 | 0.55 |
| −30 +45 | 42 | 4.20 | 12.8 | 0.94 | 0.60 |
| −45 +80 | 42 | 4.20 | 8.6 | 0.98 | 0.70 |
| −80 +100 | 9 | 0.90 | 7.7 | 1.08 | 0.96 |
| −100 +200 | 21 | 2.10 | 5.6 | 1.25 | 1.26 |
| −200 | 56 | 5.59 | — | 1.79 | 1.45 |

Initial hot nitric acid leach tests on various grind sizes were conducted to determined the optimum size range for the Radio Hill disseminated ore. It was determined that a 4 mesh grind size (4.76 mm) would be required to have sufficient exposure of the mineralization for the leach. If the fines content, generated through crushing is excessively high then agglomeration is typically used for coarsening to prevent potential flooding during the leaching period. A 3.5 kg −4 mesh crushed ore sample was prepared and loaded into a 3" plastic column. Acidified water was pumped and sprayed into the column to establish the maximum percolation rate before flooding takes place. The percolating test results are shown in Table 3 below:

TABLE 3

Percolation Tests on Radio Hill Disseminated Ore
Column: 3" diameter
Ore Loded: 3.5 kg (100% −4.7 mm
Ore Height: 17.75"
Water pattern: spray
Critical Flow Rate: 492 ml/min
Area of Column 0.00145 m$^2$
Flow Rate: 0.20359 L/hr/m$^2$

| Flow Rate (ml/mm) | Observation |
|---|---|
| 155 | OK |
| 230 | OK |
| 385 | OK |
| 405 | OK |
| 460 | OK |
| 485 | OK |
| 520 | Flooded |
| 495 | Flooded |
| 420 | OK |
| 435 | OK |
| 495 | Flooded |
| 492 | Flood Point |

Tests were carried out to optimize the leach culture selection and operating conditions. The tests were carried out with various cultures, temperature conditions, pH and finally nutrient addition. The test matrix used to optimize the chalcopyrite culture as well as the indigenous culture for metals extraction is summarized in Table 4 below:

Each test was carried out in 5 liter aerated reactor vessels. A 3 liter portion of the prepared inoculum and 300 grams of the ore sample was added to each vessel. The tanks were agitated at a rate sufficient to keep the solids suspended (450–500 rpm). The tanks were monitored for dissolved oxygen (DO), pH, oxidation reduction potential (ORP), $Fe^{2+}$, $Fe^{3+}$, $Fe^{total}$, as required. Acid was added to maintain the desired pH. Solution samples were removed from the tanks, filtered and solids were returned to the leach tanks.

Solution samples were assayed by atomic absorption spectroscopy (AAS) for metal concentration. Final leach residues were assayed for Ni, Co, Cu, Fe, and S, after washing with dilute $H_2SO_4$ and drying. Preliminary optimization test results are shown in Table 5 below. Extractions of >90% Cu and Ni were attainable within 14–22 days using the applicant's (POT) inoculum, at temperatures of 50–60° C. and pH of 1–1.8. Co extractions behaved in a similar manner although extractions were somewhat less at >85. %.

TABLE 4

Optimization Test Matrix

| Test # | Innoculum | Temp. (° C.) | pH | Nutrient (g/l) $(NH_4)_2SO_4$ | $K_2HPO_4$ | $MgSO_4 \cdot 7H_2O$ | $H_3PO_4$ | $H_2SO_4$ |
|---|---|---|---|---|---|---|---|---|
| 1 | Radio Hill | 40 | 1.0 | 1.0 | 0.5 | 0.16 | | 2.0 |
| 2 | POT | 40 | 1.0 | 1.0 | 0.5 | 0.16 | | 2.0 |
| 3 | Radio Hill | 45 | 1.0 | 1.0 | 0.5 | 0.16 | | 2.0 |
| 4 | POT | 45 | 1.0 | 1.0 | 0.5 | 0.16 | | 2.0 |
| 5 | Radio Hill | 50 | 1.0 | 1.0 | 0.5 | 0.16 | | 2.0 |
| 6 | POT | 50 | 1.0 | 1.0 | 0.5 | 0.16 | | 2.0 |
| 7 | Radio Hill | 55 | 1.0 | 1.0 | 0.5 | 0.16 | | 2.0 |
| 8 | POT | 55 | 1.0 | 1.0 | 0.5 | 0.16 | | 2.0 |
| 9 | Radio Hill | 60 | 1.0 | 1.0 | 0.5 | 0.16 | | 2.0 |
| 10 | POT | 60 | 1.0 | 1.0 | 0.5 | 0.16 | | 2.0 |
| 11 | POT | 60 | 0.8 | 1.0 | 0.5 | 0.16 | | 2.0 |
| 12 | POT | 60 | 1.0 | 1.0 | 0.5 | 0.16 | | 2.0 |

TABLE 4-continued

Optimization Test Matrix

| Test # | Innoculum | Temp. (° C.) | pH | Nutrient (g/l) | | | | $H_2SO_4$ |
|---|---|---|---|---|---|---|---|---|
| | | | | $(NH_4)_2SO_4$ | $K_2HPO_4$ | | | |
| 13 | POT | 60 | 1.4 | 1.0 | 0.5 | 0.16 | | 2.0 |
| 14 | POT | 60 | 1.8 | 1.0 | 0.5 | 0.16 | | 2.0 |
| 15 | POT | 60 | 2.2 | 1.0 | 0.5 | 0.16 | | 2.0 |
| 16 | POT | 60 | 1.4 | 1.0 | 0.5 | 0.16 | | 2.0 |
| 17 | POT | 60 | 1.4 | 0.5 | 0.25 | 0.08 | | 2.0 |
| 18 | POT | 60 | 1.4 | 0.3 | 0.16 | 0.053 | | 2.0 |
| 19 | POT | 60 | 1.4 | 1.0 | 0.0 | 0.0 | 0.331 | 2.0 |
| 20 | POT | 60 | 1.4 | 1.0 | 0.0 | 0.0 | | 2.0 |
| | | | | | | $(NH_4)_2HPO_4$ | $K_2SO_4$ | |
| 21 | POT | 60 | 1.4 | 1.0 | 0.5 | 0.0 | 0.0 | 2.0 |
| 22 | POT | 60 | 1.4 | 0.0 | 0.0 | 0.38 | 0.5 | 2.0 |
| 23 | POT | 60 | 1.4 | 0.0 | 0.0 | 0.38 | 0.0 | 2.0 |
| 24 | POT | 60 | 1.4 | 0.0 | 0.0 | 0.61 | 0.5 | 2.0 |
| 25 | POT | 60 | 1.4 | Ferric Leach | | | | |
| 26 | POT | 60 | 1.4 | Test 21 Conditions - Bioleach of Test 25 residue | | | | |

TABLE 5

Optimization Test Results

| Test # | Bacteria | Temp (° C.) | Nutrient | PH | R.T. (Days) | Cu (%) | Fe (%) | Ni (%) | Co (%) | S (%) |
|---|---|---|---|---|---|---|---|---|---|---|
| 1 | Radio | 40 | 0k Base | 1 | 8 | 31.4 | 62.2 | 48.6 | 47.4 | 36 |
| 2 | POT | 40 | 0k Base | 1 | 8 | 31.8 | 50.7 | 37.5 | 41.6 | 11.5 |
| 3 | Radio | 45 | 0k Base | 1 | 12 | 15.6 | 47.1 | 53.7 | 56.3 | 1.8 |
| 4 | POT | 45 | 0k Base | 1 | 12 | 59 | 66.7 | 66.6 | 69.4 | 36.8 |
| 5 | Radio | 50 | 0k Base | 1 | 8 | 19.7 | 51 | 49.3 | 45.2 | 8.9 |
| 6 | POT | 50 | 0k Base | 1 | 8 | 97.3 | 62.1 | 51.6 | 55.9 | 21.6 |
| 7 | Radio | 55 | 0k Base | 1 | 14 | 63.7 | 67.8 | 83.5 | 85.2 | 43.9 |
| 8 | POT | 55 | 0k Base | 1 | 14 | 98.3 | 94.6 | 88.4 | 90.7 | 27.9 |
| 9 | Radio | 60 | 0k Base | 1 | 9 | 53 | 57.5 | 71.2 | 79.7 | 8.1 |
| 10 | POT | 60 | 0k Base | 1 | 9 | 97.8 | 59.6 | 76.9 | 75.9 | 13.4 |
| 11 | POT | 60 | 0k Base | 0.8 | 9 | 39.6 | 53.1 | 74.8 | 67.1 | −9 |
| | | | | | 22 | 95.4 | 65.6 | 94 | 87.8 | 24.1 |
| 12 | POT | 60 | 0k Base | 1 | 9 | 38.3 | 54.1 | 76.3 | 72 | −6.2 |
| | | | | | 22 | 97.4 | 62.5 | 94.2 | 88 | 15.4 |
| 13 | POT | 60 | 0k Base | 1.4 | 9 | 61.1 | 38.4 | 73.3 | 69.2 | 6.9 |
| | | | | | 22 | 96.1 | 54.2 | 94.1 | 87 | 19.9 |
| 14 | POT | 60 | 0k Base | 1.8 | 9 | 85.2 | 24.3 | 66.5 | 60.7 | 11.6 |
| | | | | | 22 | 91.8 | 30.7 | 94.6 | 87.1 | −15.1 |
| 15 | POT | 60 | 0k Base | 2.2 | 9 | 50.7 | 3.5 | 58 | 50 | −21.3 |
| | | | | | 22 | 81.7 | 11.5 | 91.4 | 83 | −14 |
| 16 | POT | 60 | Table 3 | 1.4 | 17 | 88.7 | 47.2 | 91.1 | 86.1 | 9.3 |
| 17 | POT | 60 | Table 3 | 1.4 | 17 | 82.8 | 53.3 | 91.7 | 86.3 | 31.3 |
| 18 | POT | 60 | Table 3 | 1.4 | 17 | 91.1 | 53.9 | 91.5 | 84.7 | 29.3 |
| 19 | POT | 60 | Table 3 | 1.4 | 17 | 97.2 | 56.7 | 91.1 | 85.3 | 25.9 |
| 20 | POT | 60 | Table 3 | 1.4 | 17 | 77 | 54.5 | 90.5 | 84.4 | 31.7 |
| 21 | POT | 60 | Table 3 | 1.4 | 14 | 90.2 | 7.5 | 89.2 | 84.3 | 10.7 |
| 22 | POT | 60 | Table 3 | 1.4 | 14 | 89.4 | 15.6 | 89.1 | 83.1 | 31 |
| 23 | POT | 60 | Table 3 | 1.4 | 14 | 92 | 26 | 88.4 | 83.7 | 19.2 |
| 24 | POT | 60 | Table 3 | 1.4 | 14 | 83.2 | 8.9 | 87.9 | 80.8 | −10.3 |
| 25 | POT | 60 | Table 3 | 1.4 | 23 | 79.6 | Ferric Leach - Stage 1 | | | |
| 26 | POT | 60 | Table 3 | 1.4 | Bioleach on Ferric Leach Residue - Stage 2 | | | | | |

A total of 7 leach columns were setup and operated. Each column was loaded with approximately 3 kg of the sample. Leach columns were heated to control the desired operating temperature. The inoculum was sprayed from the top onto the columns to allow percolation through the test sample. Leach solution was collected in heated holding tanks (pond). Air was delivered through a distributor for proper column and holding tank aeration. The leach solution was monitored for DO, pH, ORP, $Fe^{2+}$ and $Fe^{3+}$. Acid was added as required to maintain the desired pH. Solution samples were taken on a weekly basis. The solution samples were assayed for Ni, Cu, Co and Fe. The columns were operated from 63 to 208 days.

A summary of the operating conditions and final extraction results for the 9 columns are shown in Table 6 below. The optimum column leach results were attained at pH 1.4 and 50° C. (Test 6) where approximately 80% metal extraction was achieved after 52 days of operation. A pH of 1.8 was actually selected for the pilot scale operating conditions to reduce acid consumption (0.1 tonne acid/tonne ore @ pH 1.8 as opposed to 0.2 tonne acid/tonne ore @ pH 1.4).

TABLE 6

Column Test Conditions and Leach Extraction

| Test # | Description | Temp. (° C.) | pH | Acid/Ore | Acid Wash | R.T. (Days) | Fe (%) | Cu (%) | Ni (%) | Co (%) | S (%) |
|---|---|---|---|---|---|---|---|---|---|---|---|
| 1 | downflow | 45 | 1.5 | 0.174 | No | 97 | 15.1 | 21.7 | 68.2 | 63.7 | — |
|   |          |    |     | 0.203 |    | 163 | 44.5 | 46.2 | 90 | 80 | 0.7 |
| 2 | upflow   | 45 | 1   | 0.244 | No | 63 | 30.8 | 75.8 | 58 | 51.3 | 11 |
| 3 | downflow | 60 | 1.4 | 0.190 | No | 72 | 22.9 | 53.2 | 83 | 77.6 | 0.6 |
|   |          |    |     | 0.249 |    | 163 | 47.3 | 67.6 | 93 | 83.4 | −8 |
| 5 | downflow | 60 | 1.4 | 0.179 | Yes | 34 | 26.0 | 69.3 | 83.8 | 75.0 | 3.3 |
|   |          |    |     | 0.212 |    | 79 | 32.1 | 75.9 | 91.4 | 84.8 | 9.5 |
| 6 | downflow | 50 | 1.4 | 0.193 | Yes | 52 | 26.1 | 80.5 | 79.7 | 72.5 | 4.8 |
|   |          |    |     | 0.205 |    | 94 | 33.0 | 82.8 | 86.6 | 79.0 | 17.2 |
| 7 | downflow | 50 | 1.8 | 0.105 | Yes | 52 | 8.0 | 62.0 | 79.7 | 71.2 | 4.0 |
|   |          |    |     | 0.106 |    | 93 | 18.2 | 68.4 | 85.8 | 78.0 | 6.3 |
| 9 | downflow | 45 | 1.4 | 0.159 | Yes | 59 | 32.2 | 53.2 | 79.6 | 71.5 | 7.5 |
|   |          |    |     | 0.170 |    | 105 | 32.4 | 54.3 | 85.6 | 77.7 | 17.9 |

Columns 4 and 8 were carried out to investigate ferric regeneration and iron precipitation tests, respectively, as a separate process step outside the heap as process enhancements. The columns (3" diameter×3' high) were loaded with approximately 3 kg of inert ceramic saddle substrate crushed to minus ¼". Solution was pumped to the top and percolated at a rate of 100 ml/min through the columns. The solution was collected into a 5 liter container and recycled back to the column. In Test 4 the ORP was checked on a regular basis and when the solution reached 600 mV additional ferrous iron as $FeSO_4 \cdot 7H_2O$ was added. The cycle was maintained over 4½ months, adding ferrous about every 2 to 4 days based on the ORP and the initial 30 days is presented in Table 7.

TABLE 7

Ferric Regeneration Test (Column 4)

| Day | $FeSO_4 \cdot 7H_2O$ (g) | $Fe^{2+}$ (g) |
|---|---|---|
| ORP | | |
| 0 | 624 | 15 | 3 |
|   | 504 | | |
| 1 | 526 | | |
| 2 | 590 | | |
| 3 | 612 | 15 | 3 |
|   | 506 | | |
| 4 | 534 | | |
| 5 | 609 | 15 | 3 |
|   | 501 | | |
| 6 | 510 | | |
| 7 | 561 | | |
| 8 | 617 | 15 | 3 |
|   | 501 | | |
| 9 | 534 | | |
| 10 | 608 | 15 | 3 |
|    | 503 | | |
| 11 | 547 | | |
| 12 | 624 | 15 | 3 |
|    | 512 | | |
| 13 | 551 | | |
| 14 | 608 | 15 | 3 |
|    | 497 | | |
| 15 | 548 | | |
| ORP (mV) | | | |
| 16 | 612 | 15 | 3 |
|    | 501 | | |
| 17 | 553 | | |
| 18 | 622 | 7.5 | 1.5 |
|    | 522 | | |
| 19 | 613 | 7.5 | 1.5 |
|    | 544 | | |

TABLE 7-continued

Ferric Regeneration Test (Column 4)

| Day | $FeSO_4 \cdot 7H_2O$ (g) | $Fe^{2+}$ (g) |
|---|---|---|
| 20 | 616 | 7.5 | 1.5 |
|    | 539 | | |
| 21 | 591 | | |
| 22 | 627 | 30 | 6 |
|    | 490 | | |
| 23 | 520 | | |
| 24 | 564 | | |
| 25 | 623 | 45 | 9 |
|    | 473 | | |
| 26 | 502 | | |
| 27 | 515 | | |
| 28 | 541 | | |
| 29 | 599 | | |
| 30 | 607 | | |
| Total (g) | | 217.5 | 43.7 |
| Total (g/day) | | 7.25 | 1.46 |

The ferrous regeneration column using 3 kg of substrate converted an average of 1.46 g/day of ferrous to ferric, and ranged up to 2 g/day. Based on this data, it is expected that it will take ¼ tonne of inert waste rock to treat the pregnant solution from a 1 tonne ore heap.

Test 8 was carried out to investigate control of both the Na and Fe levels in solution by acting to enhance jarosite precipitation. In the heap leach of the present invention it is envisaged that calcium carbonate will be used to precipitate iron and $Na_2CO_3$ will be used to precipitate the remaining base metals as carbonates. The filtrate containing sodium sulphate can then be used to precipitate out sodium jarosite. This effectively prevents cation build up, takes iron out of the leach circuit and produces acid at the same time. It is envisaged that Jarosite formation will be sufficient in practice using aerated waste rock heaps. Preliminary results are shown in Table 8 below:

TABLE 8

Jarosite Precipitation Column (Test 8)

| Day | ORP | $Fe^{++}$ (g/l) | $Fe^{+++}$ (g/l) | $Fe^{Tot}$ (g/l) | Na (g/l) | Comment |
|---|---|---|---|---|---|---|
| 79 | 480 | 196 | 11.04 | 13.00 | 3080 | |
| 86 | 701 | 0.17 | 14.83 | 15.00 | | |

TABLE 8-continued

Jarosite Precipitation Column (Test 8)

| Day | ORP | Fe$^{++}$ (g/l) | Fe$^{+++}$ (g/l) | Fe$^{Tot}$ (g/l) | Na (g/l) | Comment |
|---|---|---|---|---|---|---|
| 93 | 683 | 022 | 14.38 | 14.60 | 3070 | pH adjust 1.10 to 1.83 with NaOH |
| 102 | 401 | | | 12.50 | 5810 | |
| 107 | 416 | 5.59 | 5.01 | 10.60 | 5620 | |
| 114 | 671 | 3.91 | 6.29 | 10.20 | 5080 | |
| 123 | 444 | 0.84 | 7.05 | 7.89 | 4980 | |
| 128 | 680 | 0.45 | 7.48 | 7.93 | 4190 | add 30 g Fe$_2$SO$_4$ · 7H$_2$O |
| 135 | 664 | 0.119 | 8.49 | 8.61 | 4790 | |

Initial results from the jarosite precipitation testing are positive. Reference to the column from between 79 to 135 shows a gradual decrease in total Fe and sodium, indicative that jarosite precipitation is taking place.

EXAMPLE II

A 4" diameter by 16' high column was set up for a pilot of a heap leach in accordance with the first embodiment of the present invention and FIG. 1. The column was loaded with 60 kg of ore crushed to −4 mesh which had a total height of 15'. Prior to loading the ore was wetted using acidified water and thoroughly mixed to insure even distribution of fines. Acidified water was percolated through the column and acid was added as required for the initial 18 days to maintain pH 1.8 before inoculum was added. Solution draining from the bottom of the column was pumped back to a 40 liter holding tank and then recirculated back to the column. POT Chalcopyrite inoculum was used to start the column. After day 3 the column flooded and the column was switched to upflow flooded mode.

Column leach overflow was transferred to a 6" diameter by 2' height ferric regeneration column to convert the ferrous iron prior to metals recovery. The 1$^{st}$ stage column was operated at 50° C., pH 1.8 and a solution flow rate of 0.085 m$^3$/hr/m$^2$ (11.0 ml/min). The 2$^{nd}$ stage regeneration column was operated at 45° C., pH 1.8 and the solution flow rate was determined depending on the rate of ferric regeneration. The column was operated for a period of 72 days. The pilot column and ferric regeneration test results are shown in Tables 9 and 10, respectively. Final metal extraction for Ni was 71.8%, Co 66.8%, Cu 59.6%, Fe 23.9% and S 18.4%.

TABLE 9

Pilot Column Test Results

| Acid Leach: | 27.65 L of Acidified H2O |
|---|---|
| Bio-Leach: | 27.65 L of Acidified H2O |
| Feed: | 60.679 Kg (−4 mesh, 3.28% H2O, 58.689 kg dry weight) |
| Flow Rate: | 11 ml/minh (hold up = 2.65 L) |
| Operating pH: | 1.80 |
| Temperature: | 50° C. |

| Date | Day | ORP mV | Cum. Acid (ml) | Fe (%) | Ni (%) | Co (ppm) | Cu (%) | S (%) |
|---|---|---|---|---|---|---|---|---|
| Head Grade: | | | | 13.6 | 0.72 | 272 | 1.03 | 4.6 |

| | | | | Solution Assay Extraction | | | | |
|---|---|---|---|---|---|---|---|---|
| | | | | Fe (%) | Ni (%) | Co (%) | Cu (%) | S (%) |
| Acid Leach | | | | | | | | |
| Dec. 18, 1999 | 1 | 281 | 70 | | | | | |
| Dec. 29, 1999 | 13 | | 496 | 3.4 | 7.6 | 6.1 | 0.3 | |
| Jan. 4, 2000 | 19 | 364 | 1236 | 6.8 | 15.7 | 13.0 | 5.7 | |
| Jan. 6, 2000 | 21 | 361 | 1356 | 8.0 | 17.8 | 16.5 | 8.4 | |
| Jan. 10, 2000 | 25 | 369 | 1773 | 9.6 | 21.5 | 20.3 | 13.1 | |
| Jan. 13, 2000 | 28 | 362 | 2073 | 14.8 | 24.3 | 23.7 | 17.0 | |
| Jan. 17, 2000 | 29 | 366 | 2484 | 14.2 | 27.4 | 27.7 | 22.3 | |
| Jan. 18, 2000 | 30 | | | | | | | |
| Bio-Leach | | | | | | | | |
| Jan. 20, 2000 | 2 | 367 | 2514 | 15.0 | 29.3 | 29.5 | 24.1 | |
| Jan. 22, 2000 | 4 | | Column flooded turned to upflow mode | | | | | |
| Jan. 26, 2000 | 8 | 356 | 2614 | 16.7 | 34.6 | 32.9 | 30.8 | |
| Jan. 31, 2000 | 13 | 383 | 2714 | 16.6 | 40.3 | 38.9 | 37.0 | |
| Feb. 3, 2000 | 16 | 383 | 2755 | 15.3 | 39.6 | 39.0 | 36.5 | |
| Feb. 8, 2000 | 21 | 400 | 2787 | 15.8 | 49.8 | 47.5 | 44.4 | |
| Feb. 11, 2000 | 24 | 405 | 2797 | 15.4 | 52.8 | 53.4 | 46.8 | |
| Feb. 14, 2000 | 27 | 400 | 2807 | 14.9 | 55.8 | 55.5 | 48.4 | |
| Feb. 21, 2000 | 33 | 409 | 2832 | 14.0 | 59.7 | 56.0 | 50.1 | |
| Feb. 24, 2000 | 36 | 411 | 2857 | 14.0 | 61.1 | 58.8 | 51.7 | |
| Feb. 28, 2000 | 40 | 410 | 2877 | 13.6 | 67.4 | 58.1 | 53.8 | |
| Mar. 2, 2000 | 43 | 415 | 2912 | 12.9 | 65.6 | 62.3 | 54.9 | |
| Mar. 7, 2000 | 48 | 415 | 2983 | 13.4 | 69.6 | 60.2 | 54.7 | |
| Mar. 9, 2000 | 50 | 413 | 3008 | 13.6 | 68.9 | 63.6 | 54.2 | |
| Mar. 13, 2000 | 54 | 418 | 3061 | 13.9 | 69.5 | 63.8 | 55.0 | |

TABLE 9-continued

Pilot Column Test Results

| Mar. 16, 2000 | 57 | 422 | 3101 | 13.8 | 70.9 | 67.4 | 55.1 | |
|---|---|---|---|---|---|---|---|---|
| Mar. 27, 2000 | 68 | 447 | 3216 | 13.7 | 73.6 | 65.9 | 55.7 | |
| Mar. 31, 2000 | 72 | | 3216 | | | | | |
| Residue | 72 | | | 23.9 | 71.8 | 66.8 | 59.9 | 18.4 |

TABLE 10

Ferric Regeneration Test Results

| Culture: | For initial innoculation, a mixture of Inco, 40R1 and TC4 cultures were used |
|---|---|
| Feed: | 3000 g Ceramic, 1.5 L 40R1 +1.5 L Pot 10k nutrient, 600 ml hold up, Ferric Regeneration Using Fe2SO4*7H2O (25 g/l) |
| Temp.: | 45° C. |
| pH: | 1.80 |

| Date | Day | ORP1 mV | Fe2+ (g) | ORP2 mV | Acid (ml) |
|---|---|---|---|---|---|
| Dec. 22, 1999 | 0 | 453 | | | 0.0 |
| Dec. 23, 1999 | 1 | 456 | | | 0.0 |
| Dec. 24, 1999 | 2 | 471 | | | 0.0 |
| Dec. 25, 1999 | 3 | 505 | | | 0.0 |
| Dec. 26, 1999 | 4 | 661 | 20 | 529 | 0.0 |
| Dec. 27, 1999 | 5 | 610 | 20 | 508 | 0.0 |
| Dec. 28, 1999 | 6 | 676 | 20 | 500 | 0.0 |
| Dec. 29, 1999 | 7 | 680 | 20 | | 0.0 |
| Dec. 30, 1999 | 8 | 656 | 20 | 493 | 0.0 |
| Dec. 31, 1999 | 9 | 676 | 20 | 504 | 0.0 |
| Jan. 1, 2000 | 10 | 674 | 20 | 494 | 0.0 |
| Jan. 2, 2000 | 11 | 676 | 20 | 502 | 0.0 |
| Jan. 3, 2000 | 12 | 681 | 20 | 498 | 0.0 |
| Jan. 4, 2000 | 13 | 682 | 20 | 500 | 0.0 |
| Jan. 5, 2000 | 14 | 687 | 40 | 484 | 0.0 |
| Jan. 6, 2000 | 15 | 693 | 60 | 467 | 0.0 |
| Jan. 7, 2000 | 16 | 668 | 2L 9K | 427 | 0.0 |
| Jan. 8, 2000 | 17 | 692 | 20 | 495 | 0.0 |
| Jan. 9, 2000 | 18 | 700 | 40 | 477 | 0.0 |
| Jan. 10, 2000 | 19 | 702 | 160 | 438 | 0.0 |
| Jan. 11, 2000 | 20 | 485 | | | 0.0 |
| Jan. 12, 2000 | 21 | 654 | 160 | 421 | 1.0 |
| Jan. 13, 2000 | 22 | 485 | | | 1.0 |
| Jan. 14, 2000 | 23 | 669 | 160 | 430 | 1.0 |
| Jan. 15, 2000 | 24 | 480 | | | 1.0 |
| Jan. 16, 2000 | 25 | 494 | | | 1.0 |
| Jan. 17, 2000 | 26 | 621 | 160 | 460 | 1.0 |
| Jan. 18, 2000 | 27 | 447 | | | 1.0 |
| Jan. 19, 2000 | 28 | 476 | | | 1.0 |
| Jan. 20, 2000 | 29 | 535 | | | 1.0 |
| Jan. 21, 2000 | 30 | 694 | 1L TC10 | | 1.0 |
| Jan. 22, 2000 | 31 | 525 | | | 1.0 |
| Jan. 23, 2000 | 32 | 502 | | | 1.0 |
| Jan. 24, 2000 | 33 | 649 | 1L TC10 | 432 | 1.0 |
| Jan. 25, 2000 | 34 | 457 | | | 1.0 |
| Jan. 26, 2000 | 35 | 503 | | | 1.0 |
| Jan. 27, 2000 | 36 | 669 | 1L TC10 | 427 | 31.0 |
| Jan. 28, 2000 | 37 | 459 | | | 31.0 |
| Jan. 29, 2000 | 38 | 518 | | | 31.0 |
| Jan. 30, 2000 | 39 | 682 | | | 31.0 |
| Jan. 31, 2000 | 40 | 431 | 1L TC10 | 427 | 31.0 |
| Feb. 1, 2000 | 41 | 448 | | | 31.0 |
| Feb. 2, 2000 | 42 | 481 | | | 31.0 |
| Feb. 3, 2000 | 43 | 678 | 1L TC10 | 426 | 31.0 |
| Feb. 4, 2000 | 44 | 458 | | | 31.0 |
| Feb. 5, 2000 | 45 | 698 | | | 31.0 |
| Feb. 6, 2000 | 46 | 570 | | | 31.0 |
| Feb. 7, 2000 | 47 | 697 | 1L TC10 | 427 | 31.0 |
| Feb. 8, 2000 | 48 | 458 | | | 31.0 |
| Feb. 9, 2000 | 49 | 598 | | | 31.0 |
| Feb. 10, 2000 | 50 | 659 | 1L TC10 | 427 | 31.0 |
| Feb. 11, 2000 | 13 in. column | | 2L 0k | | 31.0 |
| Feb. 12, 2000 | 51 | 683 | | | 31.0 |
| Feb. 13, 2000 | 52 | 632 | | | 31.0 |
| Feb. 14, 2000 | 53 | 685 | 1L TC10 | 410 | 31.0 |
| Feb. 15, 2000 | 54 | 462 | | | 31.0 |
| Feb. 16, 2000 | 55 | 398 | 6L 9k | | 35.0 |
| Feb. 17, 2000 | 56 | 476 | | | 35.0 |
| Feb. 18, 2000 | 57 | 673 | 1L TC10 | 427 | 35.0 |
| Feb. 19, 2000 | 58 | 681 | 1L TC10 | | 35.0 |
| Feb. 20, 2000 | 59 | 675 | | | 35.0 |
| Feb. 21, 2000 | 60 | 667 | 1L TC10 | 435 | 35.0 |
| Feb. 22, 2000 | 61 | 680 | 2L TC10 | 421 | 35.0 |
| Feb. 23, 2000 | 62 | 637 | 3L TC10 | 385 | 35.0 |
| Feb. 24, 2000 | 63 | 526 | | | 35.0 |
| Feb. 25, 2000 | 64 | 656 | | | 35.0 |
| Feb. 26, 2000 | 65 | 693 | 2L Fe 2+ | 411 | 35.0 |
| Feb. 27, 2000 | 66 | 620 | 2L Fe 2+ | 408 | 35.0 |
| Feb. 28, 2000 | 67 | 430 | | | 37.0 |
| Feb. 29, 2000 | 68 | 600 | 2L Fe 2+ | 397 | 41.0 |
| Mar. 1, 2000 | 69 | 491 | | | 41.0 |
| Mar. 2, 2000 | 70 | 641 | 2L Fe 2− | 389 | 46.0 |
| Mar. 3, 2000 | 71 | 470 | | | 54.0 |
| Mar. 4, 2000 | 72 | 536 | | | 54.0 |
| Mar. 5, 2000 | 73 | 656 | | | 54.0 |
| Mar. 6, 2000 | 74 | 651 | 2L Fe 2+ | 441 | 61.0 |
| Mar. 7, 2000 | 75 | 444 | | | 61.0 |
| Mar. 8, 2000 | 76 | 660 | 2L Fe 2+ | 421 | 61.0 |
| Mar. 9, 2000 | 77 | 651 | 2L Fe 2+ | 406 | 66.0 |
| Mar. 10, 2000 | 78 | 634 | 2L Fe 2+ | 393 | 69.0 |
| Mar. 11, 2000 | 79 | | | | 69.0 |
| Mar. 12, 2000 | 80 | 710 | 2L Fe 2+ | 390 | 69.0 |
| Mar. 13, 2000 | 81 | 439 | | | 69.0 |
| Mar. 14, 2000 | 82 | 641 | 2L Fe 2+ | 414 | 69.0 |
| Mar. 15, 2000 | 83 | 500 | | | 69.0 |
| Mar. 16, 2000 | 84 | 674 | 2L Fe 2+ | 416 | 79.0 |
| Mar. 17, 2000 | 85 | 616 | 2L Fe 2+ | 384 | 89.0 |
| Mar. 18, 2000 | 86 | 620 | 2L Fe 2+ | 405 | 89.0 |
| Mar. 19, 2000 | 87 | 515 | | | 89.0 |
| Mar. 20, 2000 | 88 | 662 | 2L Fe 2+ | 400 | 104.0 |

EXAMPLE III

Figure 4:
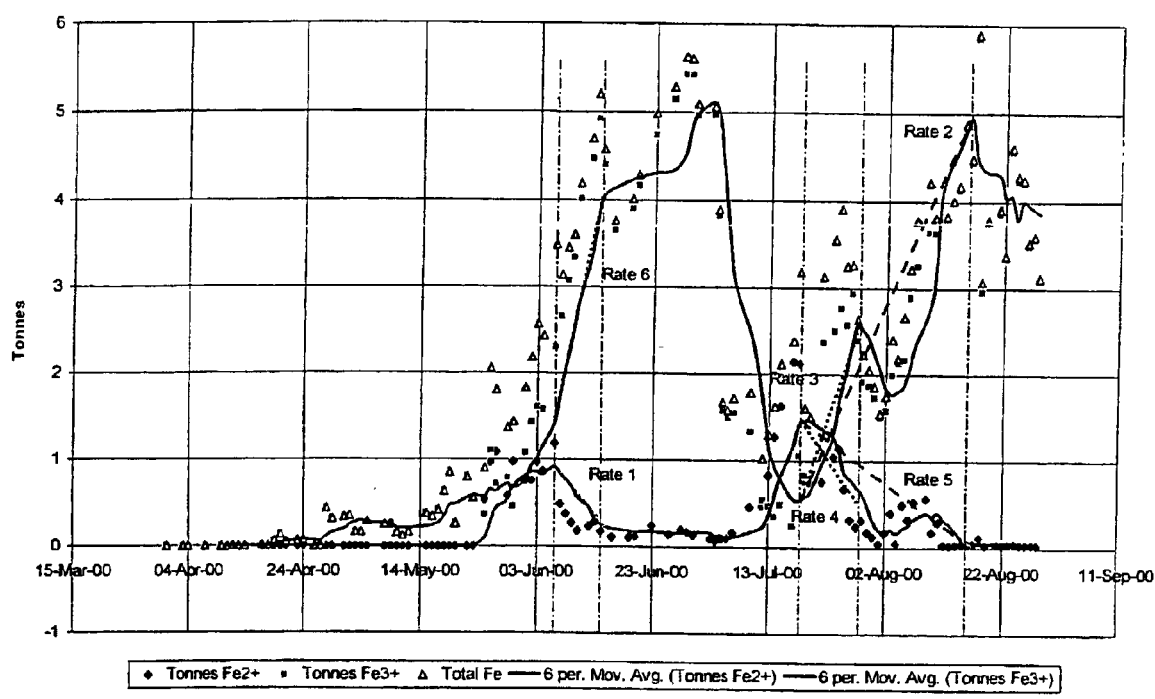
FIG. 4 is a graphical representation of the mass of ferric, ferrous and total iron within the leach solution pond over time for Example III.

Further testing was conducted on a pilot plant constructed in accordance with the first embodiment of the present invention and FIG. 1, comprising a 5000 tonne heap composed of the Radio Hill disseminated ore referred to previously. FIG. 4 shows the mass of ferric iron, ferrous iron and the total amount of iron within the liquor holding pond over a period of time. Two trend curves are shown added, one showing a six day rolling average of ferrous iron A, the other, a six day rolling average of ferric iron B, present within the liquor holding pond.

Examination of the rolling average curve for ferric iron A shows three distinct periods over which ferrous conversion took place:

Period 1—Jun. 6, 2000→Jun. 14, 2000
Period 2—Jul. 7, 2000→Jul. 28, 2000
Period 3—Jul. 18, 2000→Aug. 15, 2000

Period 1 was run at an irrigation rate of 100 L/m$^2$/h. Periods 2 & 3 varied between 10 L/m$^2$/hr and 50 L/m$^2$/hr. During Period 3 some interruptions to the system were experienced and it is expected that these would be taken into account when operating the ferric generator on an ongoing basis. These three periods can be used to evaluate the operation of the heap leach.

The masses of ferric and ferrous iron present in the pond have been extrapolated from the trend curves in FIG. 4 to provide values of each iron moiety on the given dates, see Table II below. It is important to stress that these values do not account for the mass of iron held within the ore or waste heaps. It is assumed that any liquor in the waste heap is entirely ferric and the ore heap need not be included for the purposes of the rate calculation.

TABLE II

Levels of ferrous and ferric iron present within the pond on the given dates, extrapolated from the rolling average curves.

| Date | Tonnes of Ferric | Tonnes of Ferrous |
|---|---|---|
| Jun. 6, 2000 | 1.406 | 0.918 |
| Jun. 14, 2000 | 4.041 | 0.252 |
| Jul. 18, 2000 | 0.526 | 1.414 |
| Jul. 28, 2000 | 2.595 | 0.701 |
| Aug. 15, 2000 | 4.811 | 0.104 |

Examination of the rate curves during each period indicate that the rate of ferrous conversion appears to be higher during period 1 slightly lower during period 2 and the slowest for period 3. Since the levels of total iron in solution were highest during period 1 this suggests that high levels of total iron in solution do not hamper the rate of ferrous iron conversion.

Examination of the iron conversion rates over period 1 and 2 and 1 and 3, indicates that a slight variation is present and this appears to be dependant on the irrigation rate of the feed solution.

Table 12 below illustrates the conversion rates over the three periods defined at the various flow rates for each period. The flow rates quoted below are averaged over each period of time.

TABLE 12

Rates of Ferric conversion at different flow rates

| Date | Tonnes Ferric | Flow rate l/m²/hr | Elapsed Time (days) | Heap Tonnes | Ferric Conversion kg/hr | Conversion Rate g/hr/tonne waste rock |
|---|---|---|---|---|---|---|
| Jun. 8, 2000 | 1.406 | 100 | 8 | 3740 | 13.72 | 3.67 |
| Jun. 14, 2000 | 4.041 | 100 | | 3740 | | |
| Diff | 2.635 | | | | | |
| Jul. 18, 2000 | 0.526 | 65 | 10 | 3740 | 8.62 | 2.30 |
| Jul. 28, 2000 | 2.595 | 65 | | 3740 | | |
| Diff | 2.069 | | | | | |
| Jul. 18, 2000 | 0.526 | 50 | 28 | 3740 | 6.38 | 1.70 |
| Aug. 15, 2000 | 4.811 | 50 | | 3740 | | |
| Diff | 4.285 | | | | | |

It is important to note that no account has been made of any iron that precipitates in the ferric generating heap and it is highly likely that the ferrous conversion rates are in fact significantly higher than those noted in Table 12. The results suggest that the maximum capacity of the heap lie at a flow rate either above 100 L/m²/h or between 65 L/m²/h and 100 L/m²/h. The results indicate that on a given heap the rate of ferrous conversion is dependent on the irrigation rate of the heap. The total levels of iron in solution appear to have no detrimental effect on the rate of iron conversion.

Figure 5:
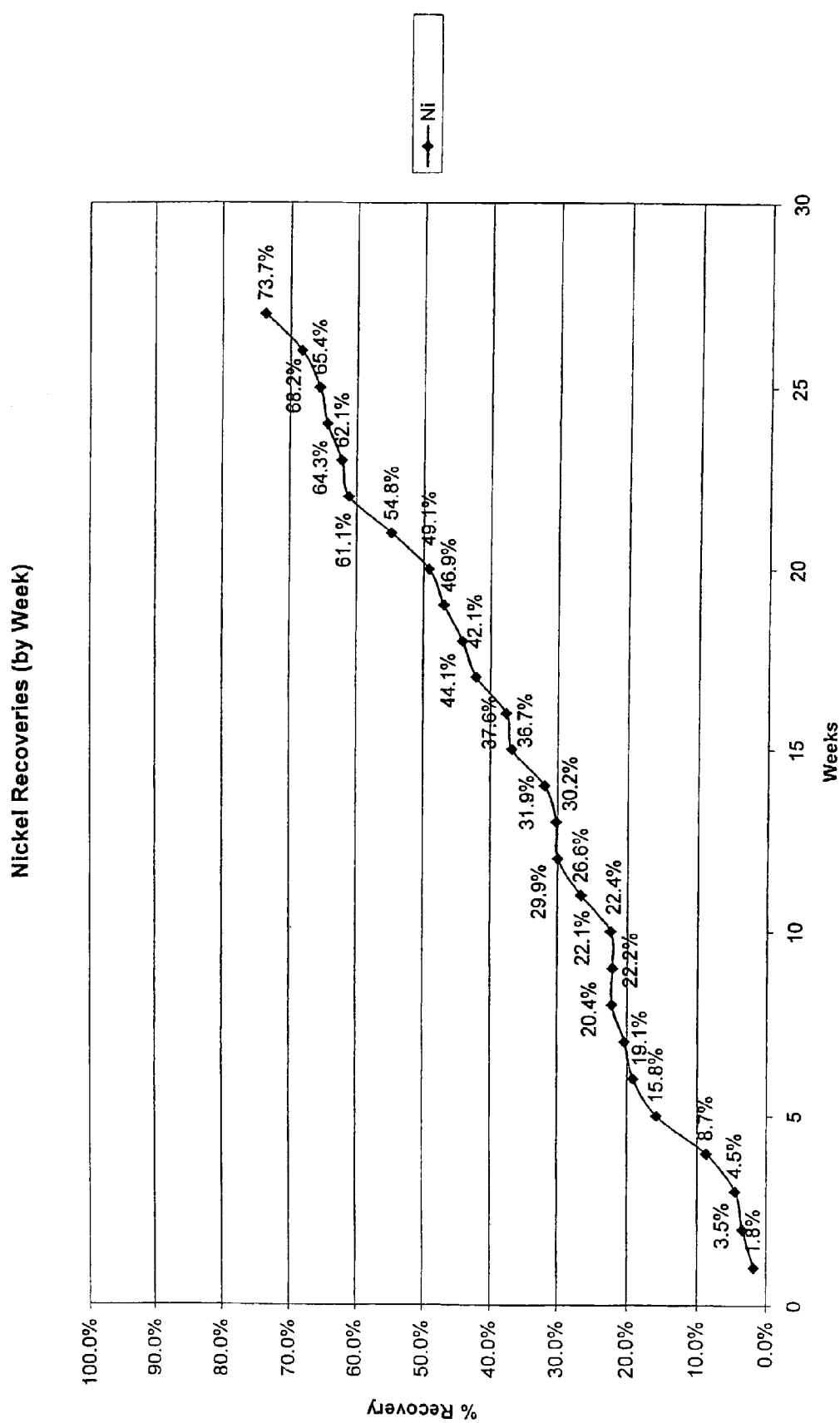
FIG. 5 is a graphical representation of the rate of nickel leaching from the leach heap of Example III.

FIG. 5 describes the rate of recovery of nickel from the ore heap of Example III.

Modifications and variations such as would be apparent to the skilled addressee are considered to fall within the scope of the present invention.

What is claimed is:

1. A bacterially assisted heap leach process characterized by the steps of:
   providing an ore heap to oxidize sulphide minerals therein;
   providing a biological contactor inoculated with ferrous iron oxidizing bacteria;
   providing at least one leach solution pond to feed solution to, and receive leach solution from the ore heap and the biological contactor;
   passing leach solution from the at least one leach solution pond to the biological contactor; and
   bleeding a portion of the leach solution being fed from the biological contactor to the at least one leach solution pond and passing said portion of leach solution to a means for metals recovery.

2. The bacterially assisted heap leach process of claim 1, characterized in that the oxidation of the sulphide minerals is achieved through the action of chemolithotrophic bacteria.

3. The bacterially assisted heap leach process of claim 1, characterized in that the biological contactor is provided in the form of a second heap.

4. The bacterially assisted heap leach process of claim 3, characterized in that one or both of the heaps are aerated at or near a base thereof.

5. The bacterially assisted heap leach process of claim 3, characterized in that the second heap is formed of waste rock that is relatively inert with regard to acid consumption.

6. The bacterially assisted heap leach process of claim 3, characterized in that the second heap is inoculated with *Thiobacillus ferrooxidans* or similar bacteria.

7. The bacterially assisted heap leach process of claim 1, characterized in that the leach solution is recycled more than once through the ore heap to increase the level of dissolved metals therein.

8. The bacterially assisted heap leach process of claim 1, characterized in that at least a portion of the ferric iron in the leach solution is precipitated by hydration.

9. The bacterially assisted heap leach process of claim 8, characterized in that the precipitation of iron in the leach solution forms jarosite or goethite, and acid.

10. The bacterially assisted heap leach process of claim 8, characterized in that the precipitation of iron occurs in the biological contactor.

11. The bacterially assisted heap leach process of claim 8, characterized in that the precipitation of iron occurs only in either or both of the ore heap or biological contactor.

* * * * *